Figure 1:
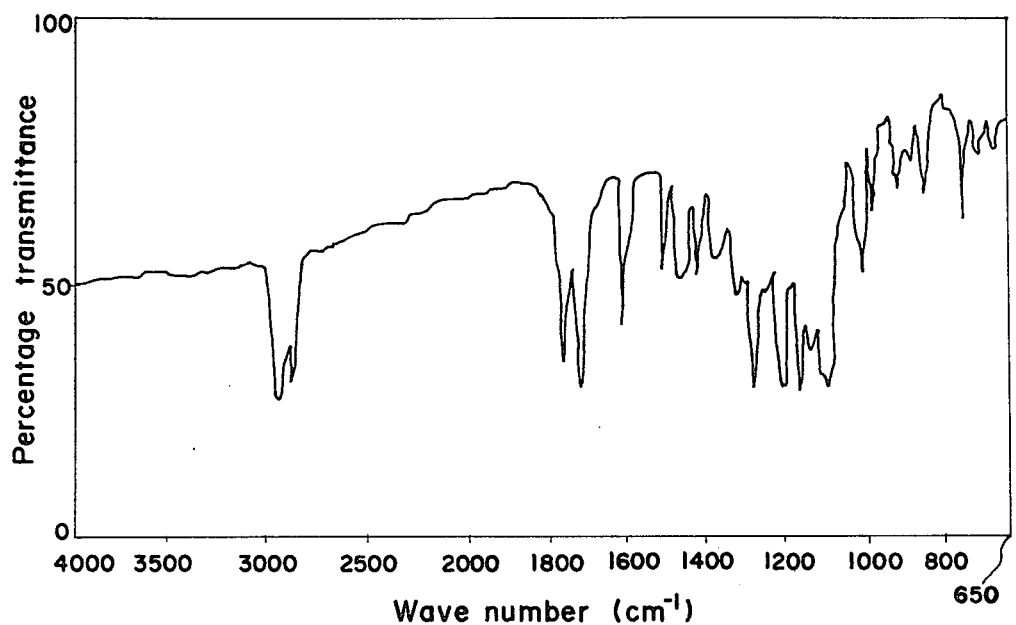

United States Patent [19]

Nakagawa et al.

[11] Patent Number: 4,478,741
[45] Date of Patent: Oct. 23, 1984

[54] 4-ALKYLCYCLOHEXYL 4-ALKANOYLOXYBENZOATE AND LIQUID CRYSTAL COMPOSITION THEREOF

[75] Inventors: Kenichi Nakagawa, Tenri; Shigehiro Minezaki, Ikoma; Fumiaki Funada, Yamatokoriyama, all of Japan

[73] Assignee: Sharp Kabushiki Kaisha, Osaka, Japan

[21] Appl. No.: 489,898

[22] Filed: Apr. 29, 1983

[30] Foreign Application Priority Data

Apr. 30, 1982 [JP] Japan .................. 57-74426

[51] Int. Cl.$^3$ .................. C09K 3/34; G02F 1/13; C07C 69/78; C07C 69/88
[52] U.S. Cl. .................. 252/299.63; 252/299.5; 252/299.67; 350/350 R; 560/61; 560/73; 560/138
[58] Field of Search .................. 252/299.63, 299.67, 252/299.64, 299.5; 350/350 R; 560/61, 73, 138

[56] References Cited

U.S. PATENT DOCUMENTS

| 3,770,654 | 11/1973 | Katagiri et al. ............ 252/299.67 |
| 3,876,286 | 4/1975 | Deutscher et al. ......... 252/299.67 |
| 4,001,137 | 1/1977 | Steinstrasser ............... 252/299.67 |
| 4,229,315 | 10/1980 | Krause et al. ............... 252/299.63 |
| 4,293,434 | 10/1981 | Deutscher et al. ......... 252/299.63 |
| 4,349,452 | 9/1982 | Osman et al. ............... 252/299.63 |
| 4,419,263 | 12/1983 | Praefcke et al. ............ 252/299.63 |

FOREIGN PATENT DOCUMENTS

| 3029378 | 2/1981 | Fed. Rep. of Germany ................ 252/299.63 |
| 105701 | 5/1974 | German Democratic Rep. .................... 252/299.63 |
| 146041 | 1/1981 | German Democratic Rep. .................... 252/299.63 |
| 55-57539 | 4/1980 | Japan ............... 252/299.63 |
| 57-48945 | 3/1982 | Japan ............... 252/299.63 |
| 57-67538 | 4/1982 | Japan ............... 252/299.63 |

OTHER PUBLICATIONS

C.A., vol. 89, 129197m, (1978).
Demus, D., "Nonemissive Electrooptic Displays, pp. 83–119, (1975).
Gray, G. W., Mol. Cryst. Liq. Cryst., vol. 63, pp. 3–18, (1981).
Demus, D. et al., Mol. Cryst. Liq. Cryst., vol. 63, pp. 129–144, (1981).

*Primary Examiner*—Teddy S. Gron
*Attorney, Agent, or Firm*—Birch, Stewart, Kolasch & Birch

[57] ABSTRACT

A liquid crystal composition contains a compound of the formula:

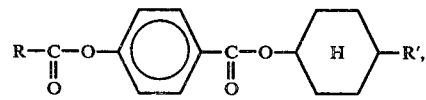

wherein R and R' are straight chain alkyl groups each having 1 to 7 carbon atoms.

6 Claims, 4 Drawing Figures

4-ALKYLCYCLOHEXYL 4-ALKANOYLOXYBENZOATE AND LIQUID CRYSTAL COMPOSITION THEREOF

This invention relates to new nematic liquid crystal compounds and compositions containing said compounds for use in display devices.

Compounds which has a mesomorphic state or more between the solid and liquid state are called liquid crystals. Liquid crystal compounds are known to exhibit fluidity at a certain temperature range, but to have an optically anisotropic property similar to that found in a crystal. Various electrooptic effects exhibited by the nematic liquid crystal have been used in passive display devices such as in table-top and hand-held electronic calculators and wrist watches because of the low electric power consumption.

Though various nematic liquid crystals have already been used in practice, they have numerous disadvantages. For example, the duty cycle is not small enough to realize easily alphanumeric display or X-Y matrix display using liquid crystals. In the second place, the temperature range in which the material is in liquid crystal phase is limited and, in fact, it tends to crystallize at low temperature.

It is the primary object of this invention to provide new liquid crystal compositions being substantially free from abovementioned disadvantages and having a stable molecular structure.

According to the present invention, there is provided a liquid crystal compound of the formula:

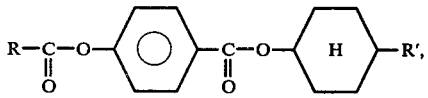

wherein R and R' are straight chain alkyl groups each having 1 to 7 carbon atoms.

Figure 2:
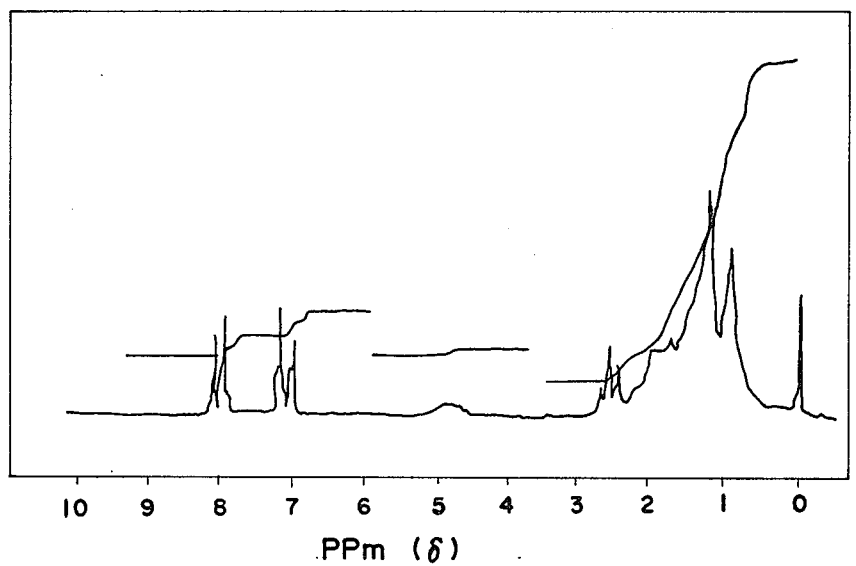
Figure 3:
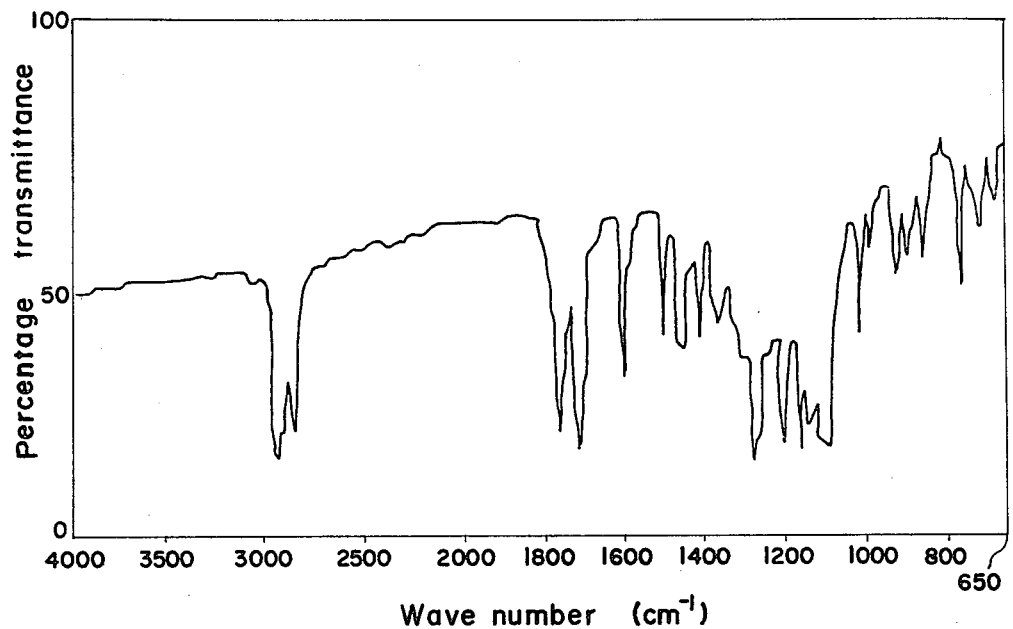
Figure 4:
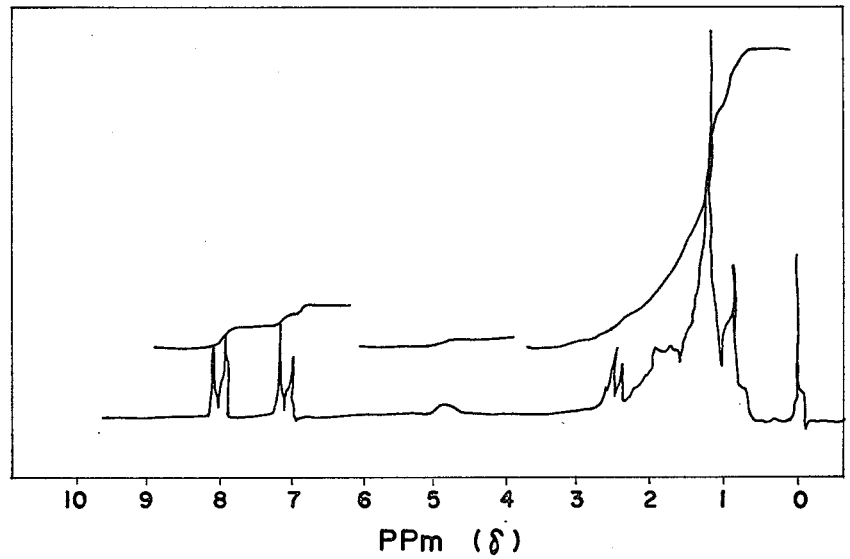

FIG. 1 shows an infrared absorption (IR) spectrum of trans-4-propylcyclohexyl 4-pentanoyloxybenzoate, FIG. 2 shows a nuclear magnetic resonance (NMR) spectrum of the compound, FIG. 3 shows an IR spectrum of trans-4-pentylcyclohexyl 4-pentanoyloxybenzoate, and FIG. 4 shows an NMR spectrum of the compound.

A group of liquid crystal compounds according to the present invention have the following general formula:

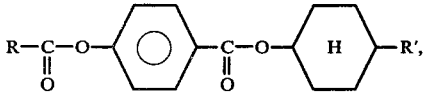

wherein R and R' are straight chain groups each having 1 to 7 carbon atoms. As is obvious from the formula, they have two ester linkages.

In general, the compounds of the present invention can be produced, first, by condensing 4-hydroxybenzoic acid with straight chained alkanoyl chloride in the presence of hydrogen chloride scavenger such as pyridine, then reacting the resultant 4-alkanoyloxybenzoic acid with thionyl chloride or with phosphorous oxychloride to produce the corresponding acid chloride, and, finally, by condensing the acid chloride with trans-4-alkylcyclohexanol in the presence of a hydrogen chloride scavenger such as pyridine.

The above described process steps can be expressed by the following formulas:

First step:

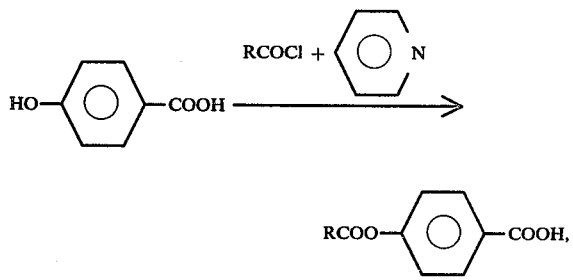

Second Step:

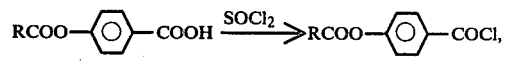

Final step:

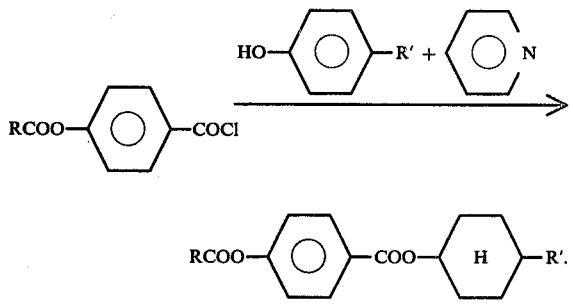

The final product is purified by repeating the recrystallization.

The present invention will now be described by way of examples which are only for the purpose of illustration and are, therefore, not intended to limit the scope of the present invention.

EXAMPLE 1

10 g 4-hydroxybenzoic acid was dissolved in 50 ml dry pyridine. The solution was then externally cooled with ice water while 10.5 g hexanoyl chloride was added dropwise. After the resultant mixture had been further stirred overnight at room temperature, it was poured in 300 ml 3-N dilute hydrochloric acid. White precipitate was taken up by filtration. By recrystallizing the white precipitate in a mixed solvent of methanol/water (3:2), 14.8 g 4-hexanoyloxybenzoic acid was obtained in 87% yield based upon the amount of the hydroxybenzoic acid.

A mixture of 10 g of the resultant 4-hexanoyloxybenzoic acid, 8 g thionyl chloride and 100 ml toluene was stirred and externally heated to be refluxed for three hours. After distilling off the toluene from the mixture, the residue was distilled under reduced pressure to give 8.8 g 4-hexanoyloxybenzoic acid chloride in 82% yield based upon the amount of the 4-hexanoyloxybenzoic acid.

In the final step, a 50 ml pyridine solution containing 3 g trans-4-propylcyclohexanol was stirred and externally cooled with ice water while 2.4 g of the 4-hexoyloxybenzoyl chloride obtained above was added dropwise. After the resultant mixture had been further stirred overnight at room temperature, it was poured into 200 ml 3-N dilute hydrochloric acid, and the product was then extracted with chloroform and washed with water. After distilling out the chloroform therefrom, the residue was dissolved in 90% ethanol and was kept at −20° C. to allow crystals of the final product, that is, trans-4-propylcyclohexyl 4-hexanoyloxybenzoate, to precipitate. The final product has the following chemical formula:

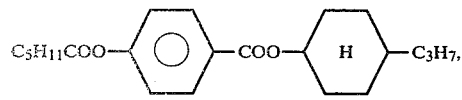

wherein both —C₅H₁₁ and —C₃H₇ are straight chain alkyl groups. 2.6 g the abovementioned compound was obtained, and the yield based upon the amount of the compound was 76%. Crystals thus obtained of the compound was purified by recrystallization from aqueous 90% methanol three times.

The crystals so formed were colorless, and exhibited nematic phase between the melting point of 32° C. and the clearing point of 47° C. FIG. 1 and FIG. 2 show an IR spectrum and an NMR spectrum of the compound obtained above, respectively.

EXAMPLE 2

By the same synthetic method as in Example 1, but using trans-4-pentylcyclohexanol in the third step instead of trans-4-propylcyclohexanol, a final product trans-4-pentylcyclohexyl 4-hexanoyloxybenzoate of the following formula was obtained:

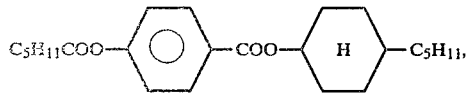

wherein —C₅H₁₁ is a straight chain group. It was recrystallized three times using 90% methanol.

The products so obtained were colorless, and exhibited a nematic phase between the melting point of 30° C. and the clearing point of 54° C. FIG. 3 and FIG. 4 show an IR spectrum and an NMR spectrum of the compound obtained above, respectively.

The new liquid crystal compounds according to this invention have negative dielectric anisotropy, and can be used as a component of the liquid crystal compositions in which the dielectric anisotropy is made positive as a whole. Such compositions can be used as a material for liquid crystal displays of, for example, the twisted nematic mode, the guest-host mode, and the cholesteric-nematic phase transition mode. Further, new liquid crystal compositions where the dielectric anisotropy is made negative as a whole can be used in liquid crystal displays of such as the DSM mode, the DAP mode and the guest-host mode.

EXAMPLE 3

The liquid crystal composition which contains above-mentioned new compounds will now be described. It consists of 55 wt % the cyanophenylcyclohexane liquid crystal, 13 wt % 4-fluorophenyl trans-4-heptylcyclohexanecarboxylate, 12 wt % 4-fluorophenyl trans-4-pentylcyclohexanecarboxylate, 10 wt % trans-4-cyclohexyl 4-hexanoyloxybenzoate, and 10 wt % trans-4-pentylcyclohexyl 4-hexanoyloxybenzoate. This composition has been found exhibiting a nematic phase between −20° C. and 62.5° C.

When the electric field was applied to a twisted nematic type liquid crystal cell with cell thickness of 6.4 micrometer prepared by use of the liquid crystal composition, the threshold voltage and the saturation voltage was 2.3 and 3.3 V, respectively, at 25° C. and with driving frequency 1 kHz. The viewing angle dependence γ (defined as a ratio of the voltage at which the transparency becomes 50% in case of the viewing angle of 15° relative to that at which the transparency becomes 90% in case of the viewing angle of 45°) of this cell was 1.32. This value is smaller than that, i.e., 1.37, exhibited by a typical prior art cell prepared by the use of the liquid crystal composition which consists of 69 wt % the phenylcyclohexane liquid crystal, 16 wt % 4-fluorophenyl trans-4-heptylcyclohexanecarboxylate and 15 wt % 4-fluorophenyl trans-4-pentylcyclohexanecarboxylate. Therefore, the liquid crystal composition according to the present invention has better characteristics for a display device in that the contrast will not substantially change with a change in viewing angle. To put it in another way, the duty cycle decreases to 1/14, much smaller than 1/10 of the prior art cell referred above. Therefore, the 40% increased multiplex driving can be available as compared with that of the prior art cell.

As described above, this invention makes it possible to produce the liquid crystal composition which exhibits a liquid crystal phase in a wide temperature range and has a low duty cycle. If the liquid crystal composition according to this invention is used in a display cell for use in, for example, clocks and table-top electronic calculators, complex display of various kinds of characters and patterns can be realized.

What is claimed is:

1. A liquid crystal compound of the formula:

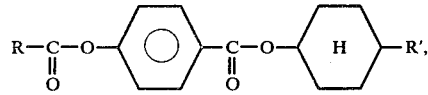

wherein R and R' are straight chain alkyl groups each having 1 to 7 carbon atoms.

2. A liquid crystal composition which contains compounds of the formula:

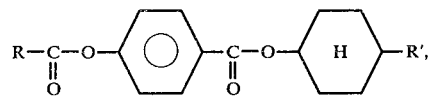

wherein R and R' are straight chain alkyl groups each having 1 to 7 carbon atoms.

3. The compound of claim 1, which has the formula:

4. The compound of claim 1, wherein said compound has the formula:
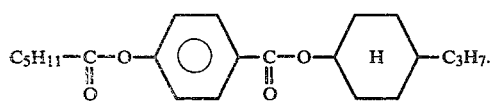
5. The compound of claim 1, wherein R is a pentyl group.
6. The composition of claim 2, which contains a mixture of said compounds.
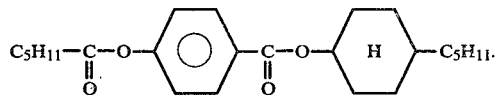
* * * * *